(12) United States Patent
Carter et al.

(10) Patent No.: US 8,950,767 B2
(45) Date of Patent: Feb. 10, 2015

(54) RUNNING AND RIDING TRAILER

(76) Inventors: Anna Lee Carter, Boise, ID (US);
Benjamin Chase Carter, Boise, ID (US)

( * ) Notice: Subject to any disclaimer, the term of this patent is extended or adjusted under 35 U.S.C. 154(b) by 888 days.

(21) Appl. No.: 12/951,959

(22) Filed: Nov. 22, 2010

(65) Prior Publication Data

US 2012/0126505 A1    May 24, 2012

(51) Int. Cl.
*B62K 27/00* (2006.01)
*A01K 1/00* (2006.01)
*B62D 63/06* (2006.01)

(52) U.S. Cl.
CPC ............. *B62K 27/003* (2013.01); *A01K 1/0035* (2013.01); *B62D 63/061* (2013.01)
USPC ............................ 280/204; 280/292; 280/202

(58) Field of Classification Search
USPC .......................................... 280/204, 202, 292
See application file for complete search history.

(56) References Cited

U.S. PATENT DOCUMENTS

| | | | | |
|---|---|---|---|---|
| 4,854,269 A | * | 8/1989 | Arntzen | ........................ 119/703 |
| 5,020,814 A | | 6/1991 | George et al. | |
| 5,054,800 A | | 10/1991 | Christensen et al. | |
| 5,176,395 A | | 1/1993 | Garforth-Bles | |
| 5,292,142 A | | 3/1994 | Vitarelli | |
| 5,305,710 A | * | 4/1994 | Ward, Jr. | ........................ 119/771 |
| 5,344,171 A | | 9/1994 | Garforth-Bles | |
| 5,375,561 A | * | 12/1994 | Gundersen | .................... 119/771 |
| 5,454,577 A | | 10/1995 | Bell | |
| 5,454,578 A | | 10/1995 | Neack | |
| 5,669,618 A | | 9/1997 | Chiu | |
| 5,785,333 A | | 7/1998 | Hinkston et al. | |
| 5,785,334 A | | 7/1998 | Robinson | |
| 5,829,771 A | | 11/1998 | Hsu | |
| 5,842,445 A | * | 12/1998 | Barbour | ........................ 119/771 |
| 5,921,571 A | | 7/1999 | Bell | |
| 6,182,990 B1 | | 2/2001 | Everett | |
| 6,874,448 B1 | | 4/2005 | Fleck | |
| 6,913,271 B2 | | 7/2005 | Gordon | |
| 6,959,938 B1 | * | 11/2005 | Liu | ............................... 280/204 |
| 7,013,840 B2 | * | 3/2006 | Leon | ............................ 119/771 |
| 7,152,554 B2 | | 12/2006 | Crawford | |
| 7,174,852 B2 | | 2/2007 | Jefferson | |
| 7,377,527 B2 | | 5/2008 | Cunningham | |
| 2006/0245867 A1 | | 11/2006 | Cunningham | |

OTHER PUBLICATIONS

Anonymous, Its a ruff ride! The new dog-powered scooter that lets your pooch walk you, MailOnline, Jan. 16, 2009, Daily Mail Reporter, United Kingdom, available at http://www.dailymail.co.uk/news/article-1118722/ (last visited Jul. 28, 2010).

* cited by examiner

*Primary Examiner* — Kevin Hurley
*Assistant Examiner* — Michael Stabley
(74) *Attorney, Agent, or Firm* — Robert L. Shaver; Dykas & Shaver

(57) ABSTRACT

Disclosed is a trailer for attachment to a vehicle. The trailer includes a frame having a first side and a second side that define a bottom area bordered by the first and second sides. Connected to the frame is an attachment arm configured to attach the trailer to the vehicle. At least one floor panel, supported by the frame, is included and is configured to selectively transition between a riding position and a running position. When the floor panel is in its riding position, the trailer is configured to carry and transport an animal. When the floor panel is in its running position, the trailer is configured to exercise the animal such that the animal is free to move under its own power in connection with the vehicle as the vehicle moves.

14 Claims, 11 Drawing Sheets

RUNNING AND RIDING TRAILER

FIELD OF THE INVENTION

The invention generally relates to an apparatus for exercising a pet and more particularly to trailers connectable to bicycles or the like for exercising a pet.

BACKGROUND OF THE INVENTION

Animals, including pets, are neither always sedentary nor always active, and pets, particularly dogs, should be exercised with walks or runs. Animal owners, too, should exercise. When both a pet dog is ready for a run and an owner is ready for physical activity, a bicycle ride with a dog in tow can make for a pleasant way for both owner and pet to get the exercise they need. However, riding a bicycle while holding a leash for a dog can be dangerous as dogs sometimes decide to run or walk in a direction other than the direction which the bike is heading. Such unwise decisions can pull the bicycle to the side and lead to accidents.

Further, it is can be difficult to predict for how long a pet will be able to walk or run. Taking a pet dog along on a bike ride can be troublesome should the dog become tired partway during the trip, and bicycles are often not configured to accommodate carrying a dog while also bicycling. One alternative is to go for a bicycle ride while simply carrying the animal in a trailer towed behind the bicycle, but this does not allow the dog to get the exercise that it needs.

SUMMARY OF THE INVENTION

The present running and riding trailer allows a user to switch between a configuration conducive for exercising an animal, such as a pet dog, and a configuration conducive for transporting a resting animal. As such, the trailer can be used before, during, and after exercising a pet.

More particularly, the running and riding trailer includes a frame to which is attached an attachment arm configured to connect the trailer to a vehicle, such as a bicycle, tricycle, scooter, or the like. The frame also includes a first side and a second side that together define a bottom area. At least one floor panel, supportable by the frame, is included. The floor panel is configured to selectively transition between a riding position and a running position.

When the floor panel is in its riding position, the floor panel is supported by the frame of the trailer, and the floor panel at least partially spans the bottom area of the frame. In this position, an animal may sit upon the floor panel and ride along with the trailer as it is pulled by the vehicle.

The floor panel is selectively transitioned from the riding position to a running position by at least partially removing the floor panel from the bottom area. In some embodiments, the floor panel is physically detached from the frame and removed completely from the bottom area. In other embodiments, the floor panel is folded or otherwise moved partially away from the maximum floor area it had occupied to expose part of the bottom area. In still other embodiments, the floor panel is pivoted away from the bottom area, to expose the bottom area to the ground beneath the trailer. Thus, when the floor panel is in its running position, an open area in the bottom area of the frame is provided within which an animal may stand, walk, or run within the confines of the first and second sides of the frame of the trailer.

The trailer further includes a leash attachment point supported by the frame, such as by a leash bar extending between the first side and second side of the frame of the trailer. At least one leash can be detachably connected to the leash attachment point so as to tether an animal to the trailer.

Accordingly, when the floor panel is in its running position, an animal may be exercised by moving under its own power in connection with the trailer to which it is leashed as the trailer is pulled by the vehicle. When the animal becomes tired of running or walking, the floor panel can be repositioned into the riding position so that the animal can finish the journey while riding along on the floor panel.

Because the floor panel of the trailer is selectively transitionable between the running and riding positions, the trailer is conducive for use by someone wanting to exercise a pet during only part of a bicycle ride. Further, because the pet need not walk or run the entire distance traveled by the vehicle, the vehicle operator can go on a long bicycle ride with his or her pet or pets where the ride would otherwise have to be cut short due to the pet's or pets' inability to walk or run the entire distance of the trip.

Additionally, when the floor panel is in the running position, because the animal utilizing the trailer is kept in a position moving with the trailer between the first side and second side of the frame of the trailer, the animal is encouraged to travel in line with the direction of travel of the vehicle to which the trailer is attached. Accordingly, a person traveling forward on his or her bicycle, pulling a trailer with a dog running inside, will not be pulled to one side or the other by the dog.

The first and second sides of the frame of the trailer also discourage other animals from having access to the animal utilizing the trailer. In some embodiments, panels are also attached to the first and second sides of the frame, making it even more difficult for a stray animal to have unwanted access to the pet within the trailer.

In some embodiments of the trailer, two floor panels are included, each of which can be selectively transitioned between a running and a riding position. Accordingly, the trailer can be used with two pet dogs, allowing both dogs to run together, both dogs to ride together, or one dog to ride while the other dog runs. Thus, one tired dog does not prevent another energetic dog from continuing to enjoy a long walk or run.

Preferably, the first and second sides of the frame, the floor panels, and other major sections of the trailer are readily detachable from one another so as to allow the trailer to be quickly disassembled in a minimal number or parts for transport within the trunk of an automobile, or the like.

The purpose of the Summary is to enable the public, and especially the scientists, engineers, and practitioners in the art who are not familiar with patent or legal terms or phraseology to determine quickly, from a cursory inspection, the nature and essence of the technical disclosure of the application. The Summary is neither intended to define the invention of the application, which is measured by the claims, nor is it intended to be limiting as to the scope of the invention in any way.

Still other features and advantages of the claimed device will become readily apparent to those skilled in the art from the following detailed description describing preferred embodiments of the device, simply by way of illustration of the best mode contemplated by carrying out the device. As will be realized, the device is capable of modification in various obvious respects all without departing from the invention. Accordingly, the drawings and description of the preferred embodiments are to be regarded as illustrative, and not restrictive.

DESCRIPTION OF THE PREFERRED EMBODIMENTS

Figure 1:
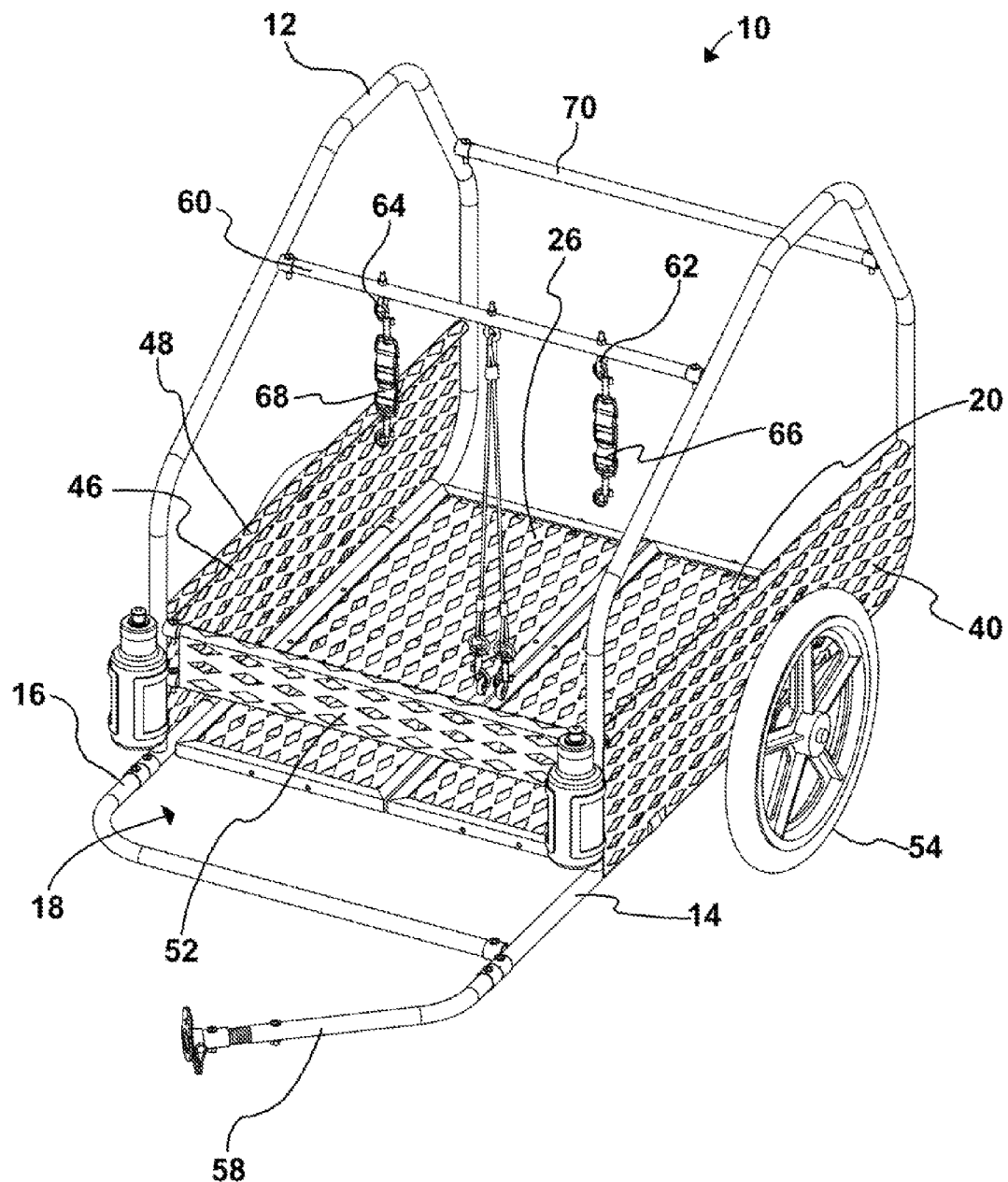
FIG. 1 is a perspective view of the top, front, and right sides of a trailer according to a first embodiment configured in a riding position.
Figure 2:
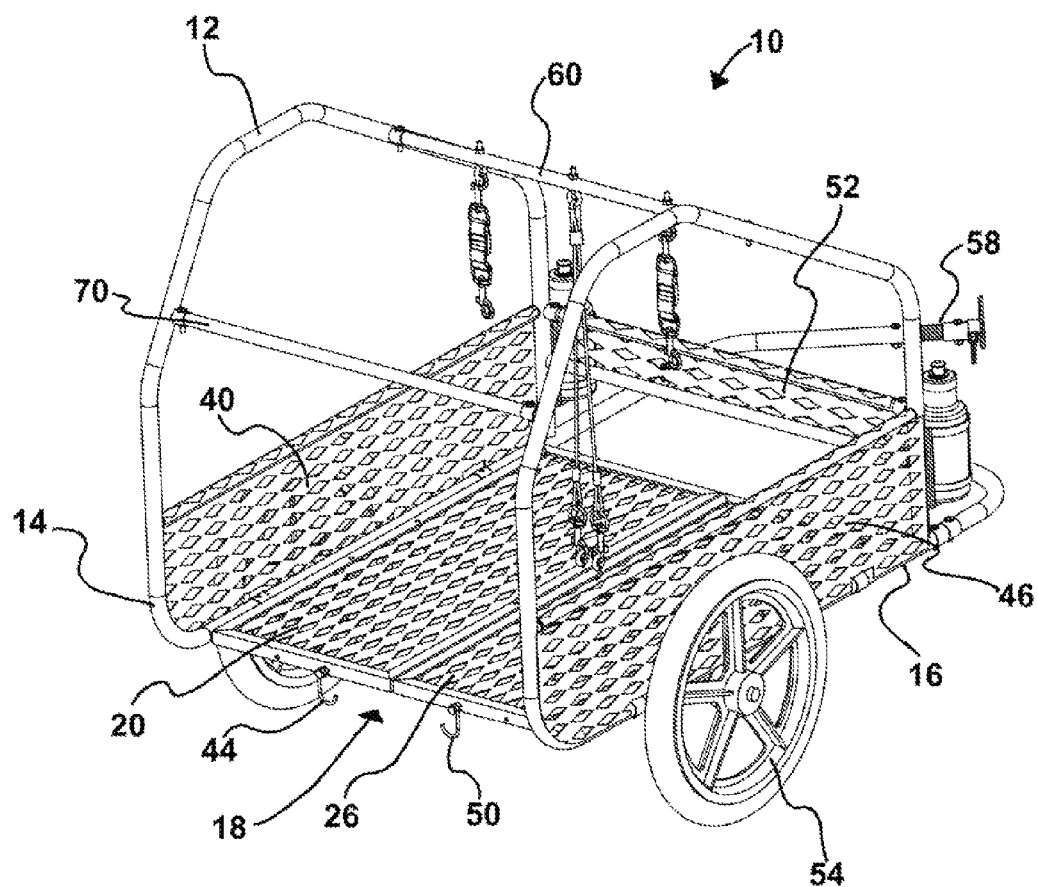
FIG. 2 is a perspective view of the top, back, and left sides of a trailer according to the first embodiment configured in a riding position.

While the running and riding trailer is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

As shown in FIGS. 1 through 13, trailer 10 includes a frame 12 that supports at least one floor panel that is configured to transition between a running configuration, in which the floor panel occupies a minimal portion of a the bottom area 18 of a frame and such that the interior of the trailer 10 is exposed to the ground, and a riding configuration, in which the floor panel covers at least a portion of the bottom area 18, thereby providing a supportive floor. Therefore, when the floor panel is in the running configuration, an animal, such as a pet dog, using the trailer 10 can walk or run along in connection with the bicycle or other vehicle to which the trailer 10 is attached. Alternatively, when the floor panel is in the riding configuration, the animal is carried and rides along in the trailer 10 as the bicycle or other vehicle travels.

In the following description and in the figures, like elements are identified with like reference numerals. The use of "e.g.," "etc.," and "or" indicates non-exclusive alternatives without limitation unless otherwise noted. The use of "including" means "including, but not limited to," unless otherwise noted.

As shown in FIG. 1, the trailer 10 includes a frame 12 that has a first side 14 and a second side 16. A bottom area 18 is defined by the first side 14 and second side 16, which also border the bottom area 18. According to the depicted preferred embodiment, the first side 14 and second side 16 define side areas that extend upward and perpendicularly from the bottom area 18. Such first sides 14 and second sides 16 define a trailer 10 with dimensions that accommodate carrying an animal fully within the trailer 10. In other embodiments, the trailer 10 includes a first side 14 and a second side 16 that do not extend upwardly, such that the resulting trailer 10 is essentially flat, when in the riding position.

An attachment arm 58 is supported by the frame 12. The attachment arm 58 is configured to connect the trailer 10 to a vehicle, such as a bicycle, scooter, tricycle, four-wheel vehicle, or the like. According to the depicted embodiment, the attachment arm 58 extends from the front of the frame 12, such that when the trailer 10 is connected to the vehicle, the trailer 10 travels behind the vehicle and in the same line of travel as the vehicle. Also according to the depicted embodiment, the attachment arm 58 is configured to attach to the axle of a bicycle and to be selectively detachable from the vehicle. Further, as shown in the figures, in some embodiments the attachment arm 58 extends from the frame 12 in alignment with the plane defined by the bottom area 18 of the frame 12.

At least one floor panel is supported by the frame 12. According to the depicted preferred embodiment, the frame 12 supports two floor panels, a first floor panel 20 and a second floor panel 26. Preferably, each floor panel, including the first floor panel 20 and second floor panel 26, is configured to selectively transition between a riding position and a running position. In some embodiments incorporating more than one floor panel, a first floor panel 20 may be configured to transition between a riding position and a running position, while a second floor panel 26 is configured only for one position and not to transition between positions.

In the riding position, the floor panel at least partially spans the bottom area 18 of the trailer 10, thereby occupying a maximum floor area. In this position, the floor panel is configured to support an animal. In the running position, on the other hand, the floor panel is at least partially removed from the bottom area 18 of the frame 12 so as to occupy a minimal floor area. Preferably, this minimal floor area occupied by the floor panel in the running position is equivalent to none of the maximum floor area occupied when the floor panel is in the riding position. As such, more of the bottom area 18 is exposed to the ground when the floor panel is in the running position than when the floor panel is in the riding position.

In some embodiments, each floor panel transitions between the riding position and the running position by being at least partially removed from the bottom area 18. In some such embodiments, the floor panel is fully removed and disconnected from the frame 12 to accomplish the transition between the riding position and running position. In other such embodiments, the floor panel is partially removed by folding or sliding a portion of the floor panel to expose part of the bottom area 18 to the ground beneath.

According to the preferred depicted embodiment, each floor panel transitions between the riding position and the running position by pivoting about the side of the frame 12 to which the floor panel is attached. As such, when the floor panel is positioned in the riding position, the floor panel and the bottom area 18 define a first pivot angle. Preferably this first pivot angle is equal to 0°, such that the floor panel extends from the side of the frame 12 to which it is attached in alignment with the plane defined by the bottom area 18. When the floor panel is positioned in the running position, the floor panel and the bottom area 18 define a second pivot angle that is greater than the first pivot angle. Preferably, the second pivot angle is approximately equal to 90°, such that the floor panel extends upwardly and perpendicularly from the plane defined by the bottom area 18.

More particularly, according to the depicted embodiment shown in FIGS. 1 through 13, the trailer 10 includes a first floor panel 20 and a second floor panel 26. The first floor panel 20 includes a first floor panel outer edge 22 and a first floor panel inner edge 24. The first floor panel 20 is supported by the frame 12 along the first floor panel inner edge 24. Likewise, the second floor panel 26 includes a second floor panel outer edge 28 and a second floor panel inner edge 30. The second floor panel 26 is supported by the frame 12 along the second floor panel inner edge 30. According to this embodiment, the lengths of the first floor panel outer edge 22, first floor panel inner edge 24, second floor panel outer edge 28, and second floor panel inner edge 30 are equal and the first floor panel outer edge 22 and second floor panel outer edge 28 meet side-by-side when the first floor panel 20 and second floor panel 26 are both in their riding positions. Further, the first floor panel 20 and second floor panel 26 are preferably of equal dimensions, such that, when in the riding positions, each of the first floor panel 20 and second floor panel 26 occupy half of the total floor area. Thus, when the first floor panel 20 is in the riding position, the maximum floor area of the first floor panel 20 is approximately half of the bottom area 18 defined by the frame 12. Likewise, when the second floor panel 26 is in the riding position, the maximum floor area of the second floor panel 26 is approximately half of the bottom area 18 defined by the frame 12.

According to embodiments utilizing only one floor panel, such a floor panel preferably has a width essentially equal to the width of the bottom area 18 defined by the first side 14 and second side 16 of the frame 12. As such, when the single floor panel is placed in the riding position, the floor panel spans essentially the entirety of the bottom area 18. In some such embodiments, the single floor panel is pivotally connected to and supported by the first side 14 of the frame 12. In other such embodiments, the single floor panel is pivotally connected to and supported by the second side 16 of the frame 12.

Figure 12:
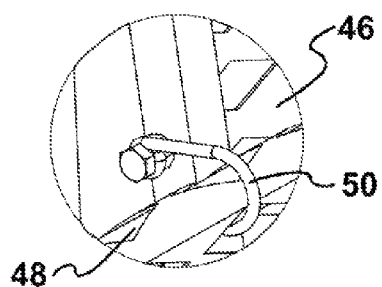
FIG. 12 is a close-up, perspective view of area B of FIG. 10.
Figure 13:
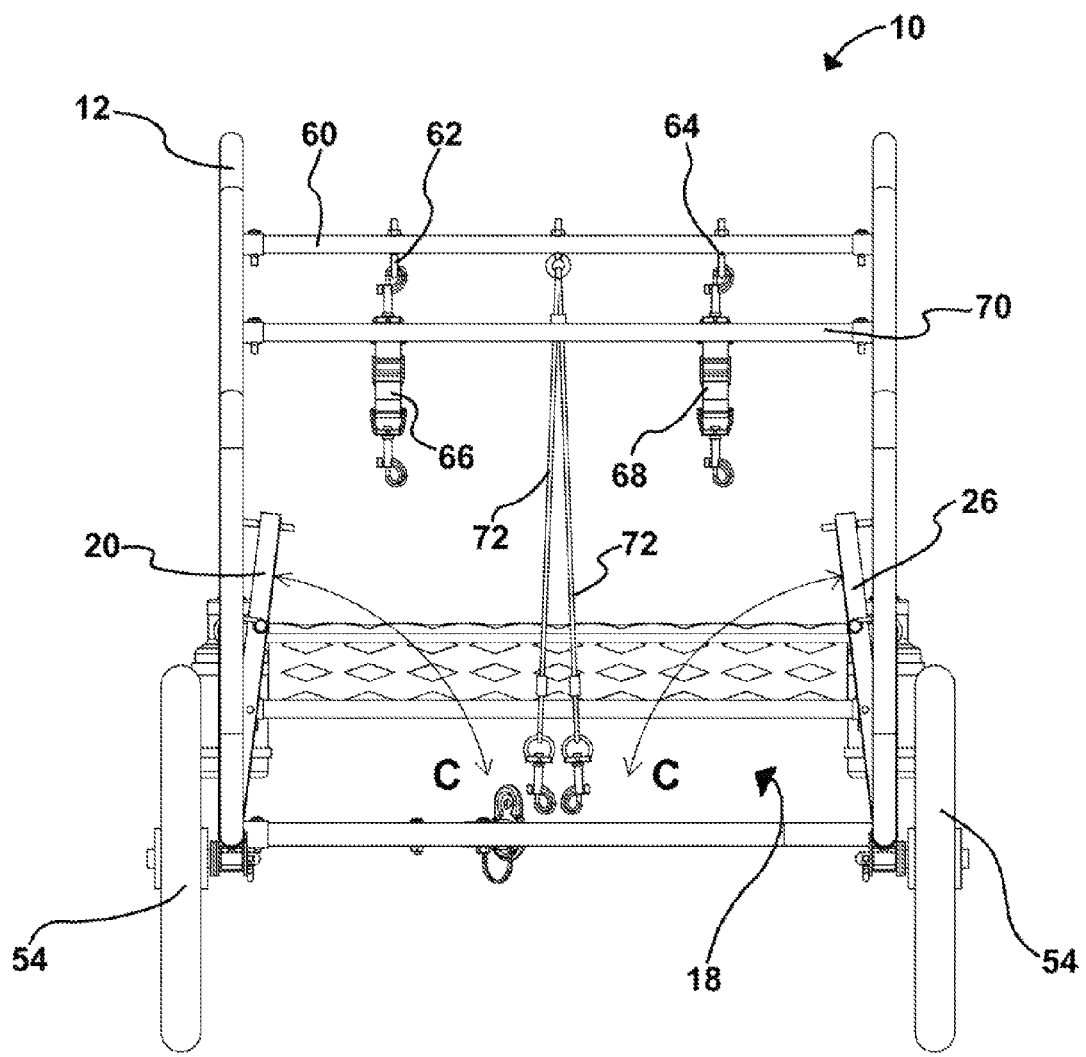
FIG. 13 is a back side elevation view of a trailer according to the first embodiment configured in a running position.

As shown in FIG. 13, the first floor panel 20 and second floor panel 26 transition from the riding position, shown in FIGS. 1 through 8, and the running position, shown in FIGS. 9 through 13, by selectively pivoting about the first side 14 and second side 16 of the frame 12, respectively, as indicated by arrows C. That is, the first floor panel 20 transitions from its riding position to its running position by pivoting the first floor panel 20 about it first floor panel inner edge 24 along the first side 14 of the frame 12. Likewise, the second floor panel 26 transitions from its riding position to its running position by pivoting the second floor panel 26 about it second floor panel inner edge 30 along the second side 16 of the frame 12.

Figure 5:
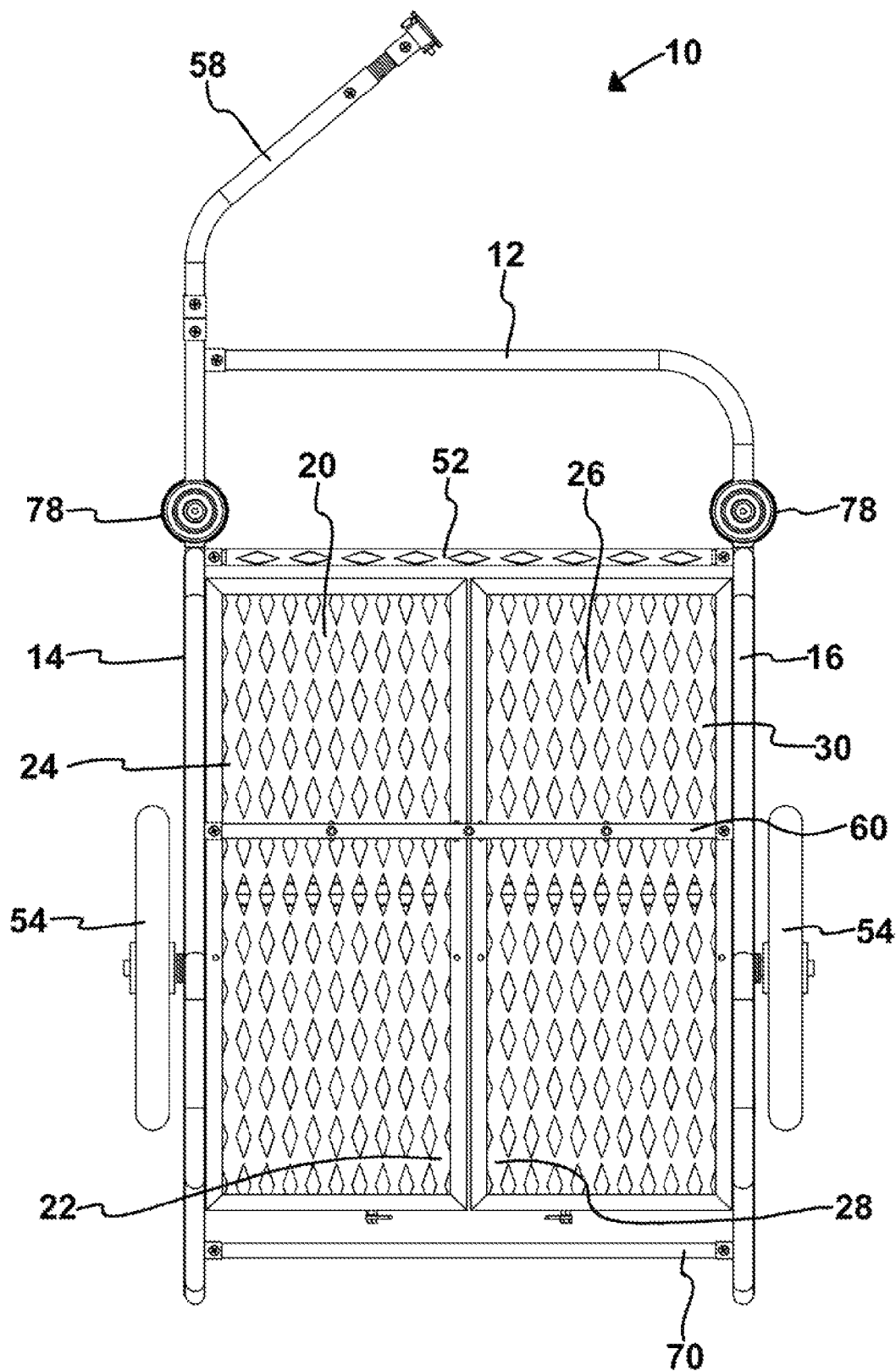
FIG. 5 is a top plan view of a trailer according to the first embodiment configured in a riding position.

The trailer 10 further includes at least one leash attachment point configured to support a leash that is configured to detachably tether an animal to the trailer 10. According to the depicted embodiment, the trailer 10 includes a leash bar 60 extending between the first side 14 and second side 16 of the frame 12. Preferably the leash bar 60 is selectively detachable from the frame 12. According to the embodiment depicted in FIG. 8, the leash bar 60 is selectively detachable via connection to the frame 12 with detachable frame connectors 76. As shown in FIG. 5, the leash bar 60 of the depicted embodiment is located essentially centrally to the length of the frame 12, and connected to the first side 14 and second side 16 of the frame 12 in an area central to each of the first floor panel 20 and second floor panel 26. As such, the leash bar 60 further contributes to the structural stability of the frame 12 and accommodates tethering of an animal or animals utilizing the trailer 10 both as the animal or animals are carried by a floor panel in the riding position or as the animal or animals run or walk behind the vehicle, beneath the leash bar 60, and between the first side 14 and second side 16 of the trailer 12.

Figure 6:
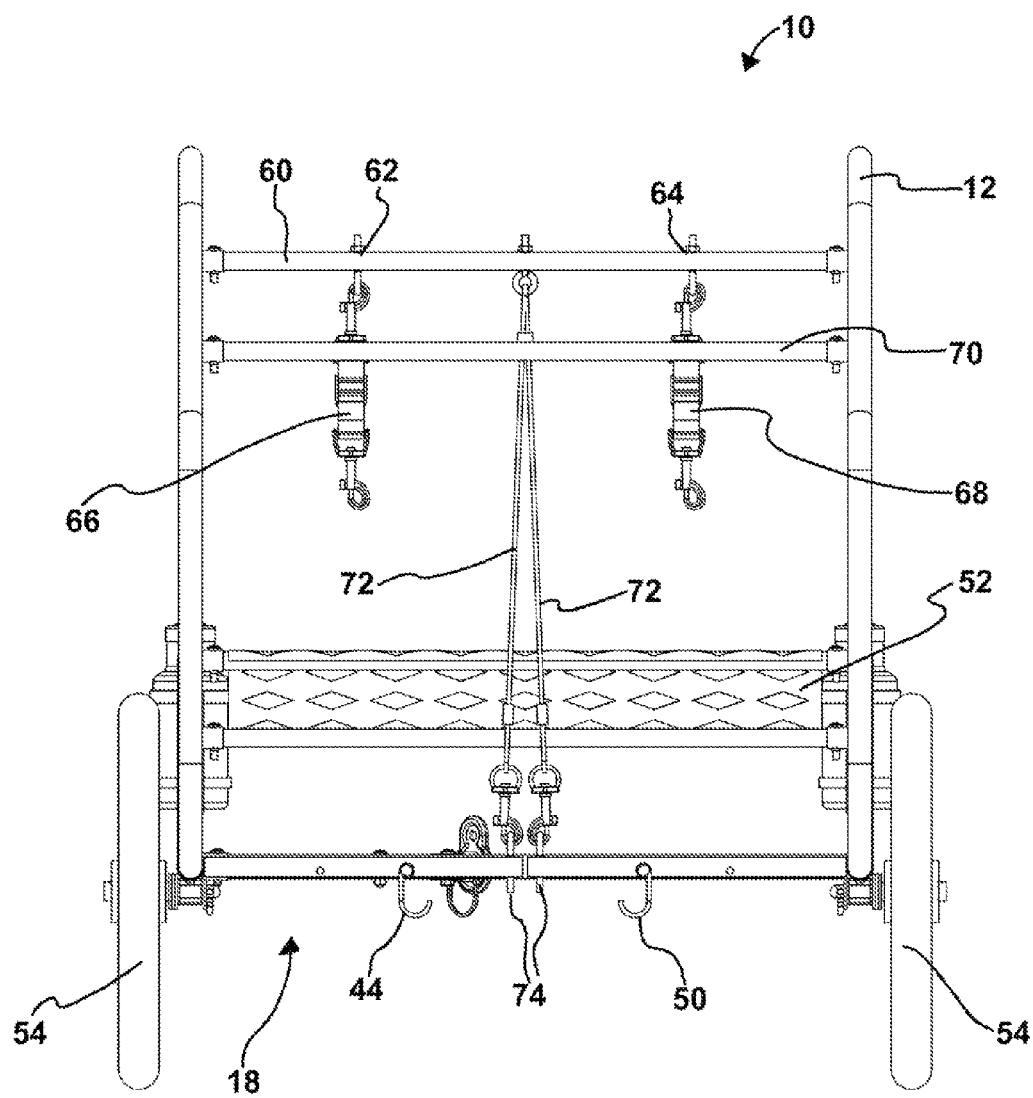
FIG. 6 is a back side elevation view of a trailer according to the first embodiment configured in a riding position.
Figure 7:
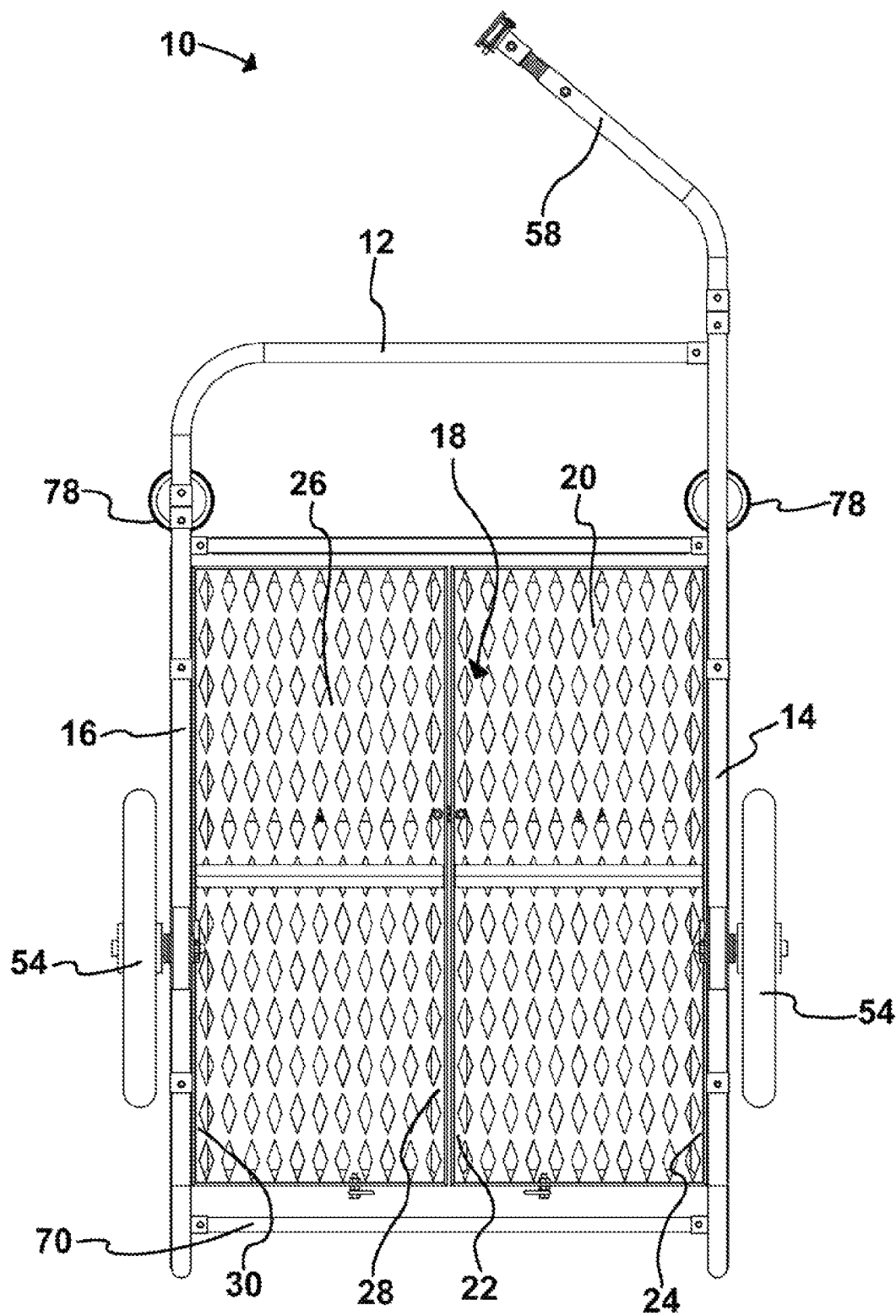
FIG. 7 is a bottom plan view of a trailer according to the first embodiment configured in a riding position.

With particular attention to FIG. 6, the leash bar 60 of the depicted embodiment includes a first leash attachment point 62 and second leash attachment point 64. The first leash attachment point 62 is configured to receive one end of a first leash 66, which preferably can be selectively detached from the first leash attachment point 62. Likewise, the second leash attachment point 64 is configured to receive one end of the second leash 68, which preferably can be selectively detached from the second leash attachment point 64. The other ends of the first leash 66 and second leash 68 can be respectively attached to a collar or harness worn by an animal utilizing the trailer 10. The embodiment depicted in the figures would make the trailer 10 conducive for use with two animals, such as two medium-sized dogs. Another such embodiment would include one leash attachment point configured to receive one end of each of two leashes. For a trailer 10 conducive for use with one animal, such as a larger dog, the leash bar 60 preferably includes just one leash attachment point configured to receive one end of one leash. Thus, various embodiments utilize various numbers of leash attachment points and leashes.

Figure 3:
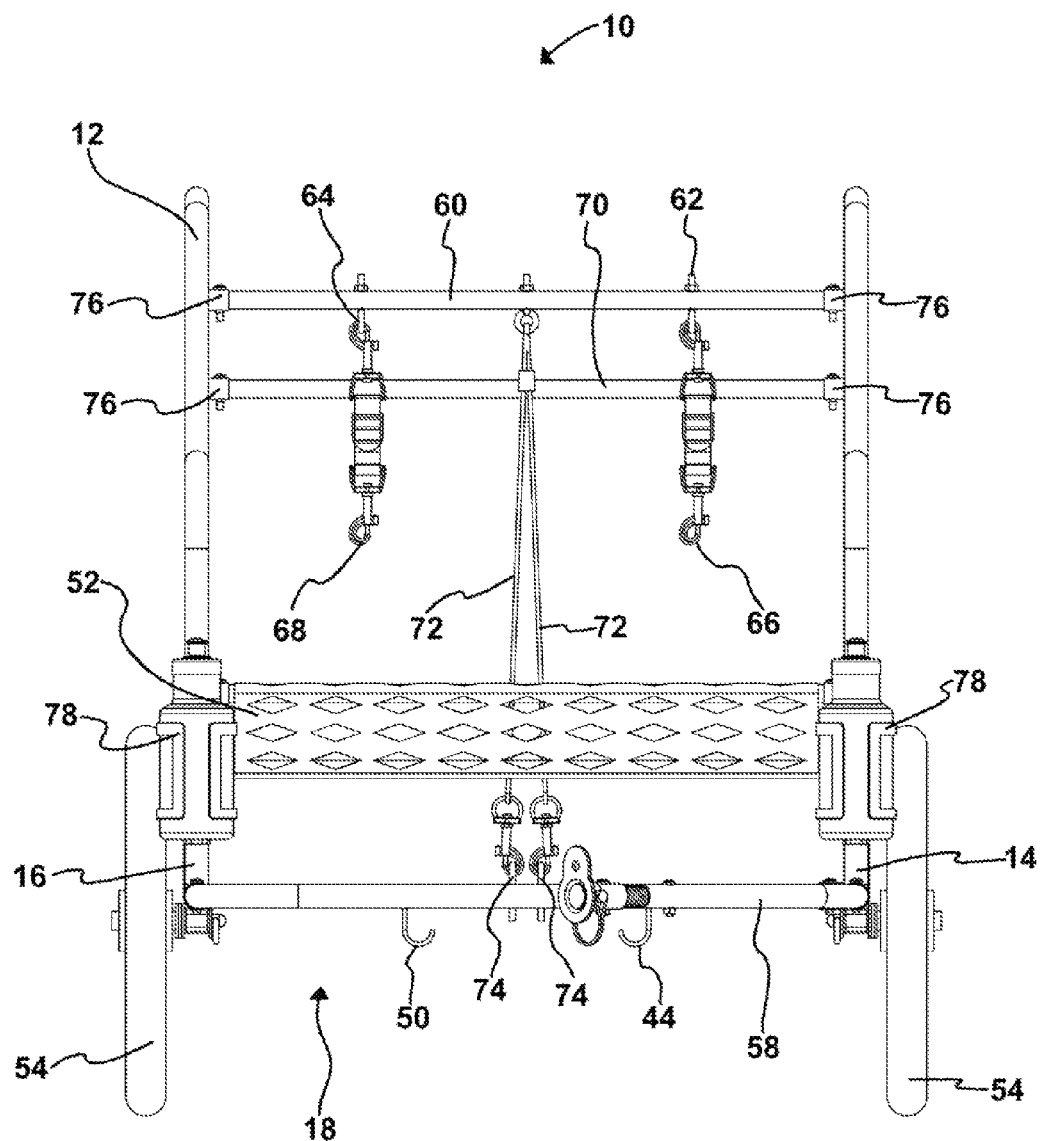
FIG. 3 is a front side elevation view of a trailer according to the first embodiment configured in a riding position.
Figure 4:
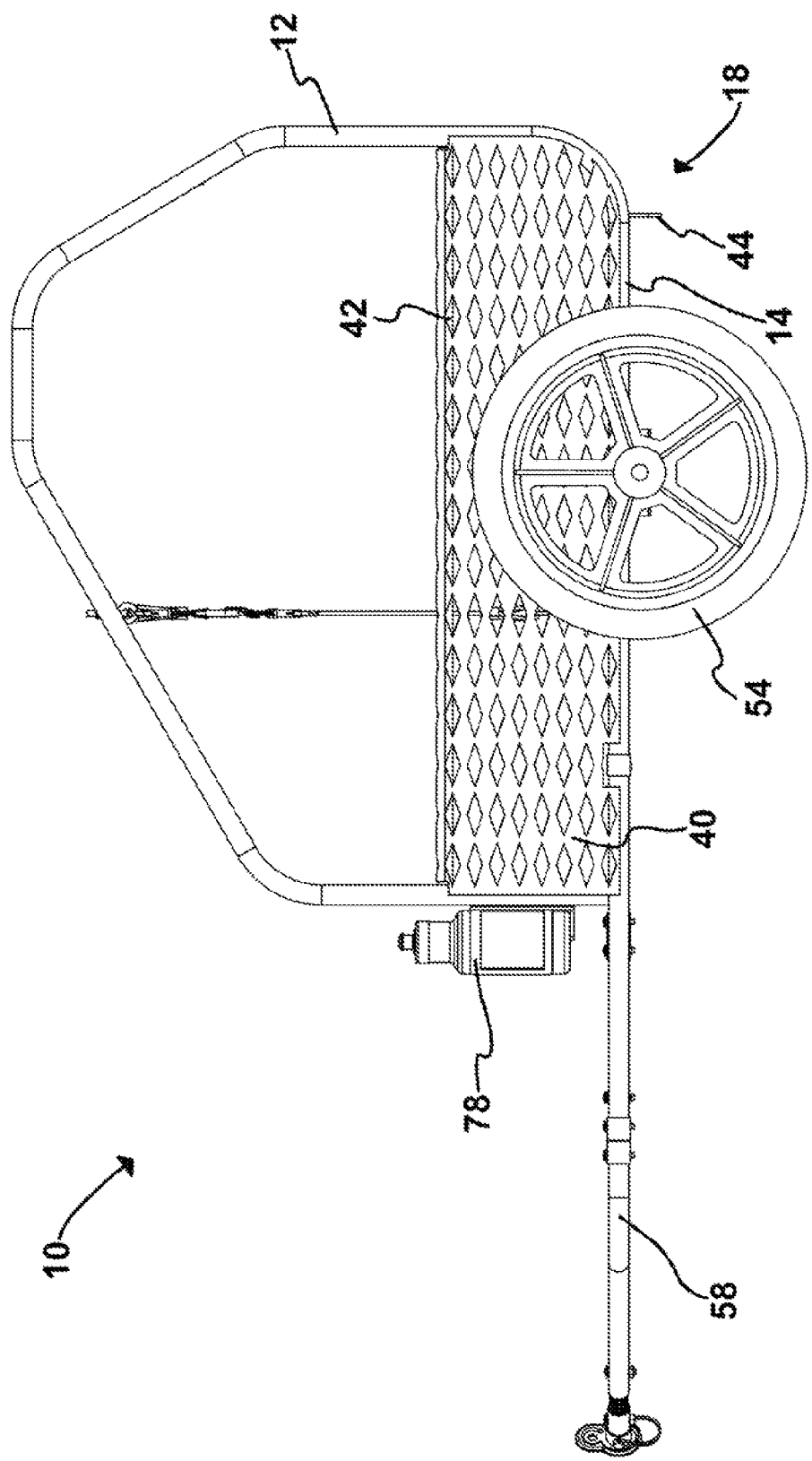
FIG. 4 is a right side elevation view of a trailer according to the first embodiment configured in a riding position.

With particular attention to FIG. 3, preferably, the trailer 10 further includes at least one flooring supporter 72 configured to selectively support a floor panel when in the riding position. According to the depicted embodiment, the trailer 10 includes a pair of flooring supporters 72 supported by the leash bar 60. Further, the first floor panel 20 includes a cable connector 74 along the first floor panel outer edge 22, and the second floor panel 26 includes a cable connector 74 along the second floor panel outer edge 28. Accordingly, when the first floor panel 20 is lowered into the riding position, the lower end of a flooring supporter 72 can be selectively connected with the cable connector 74 along the first floor panel outer edge 22 such that the flooring supporter 72 supports the first floor panel 20 along the first floor panel outer edge 22 while the first floor panel inner edge 24 continues to be supported by the first side 14 of the frame 12. Likewise, when the second floor panel 26 is lowered into its riding position, the lower end of the second flooring supporter 72 can be selectively connected with the cable connector 74 along the second floor panel outer edge 28 such that the flooring supporter 72 supports the second floor panel 26 along the second floor panel outer edge 28, while the second floor panel inner edge 30 continues to be supported by the second side 16 of the frame 12. Preferably, before transitioning the first floor panel 20 from the riding position to the running position, the flooring supporter 72 supporting the first floor panel 20 would be disconnected from the respective cable connector 74, and before transitioning the second floor panel 26 from its riding position to its running position, the flooring supporter 72 supporting second floor panel 26 would be disconnected from its respective cable connector 74.

Figure 8:
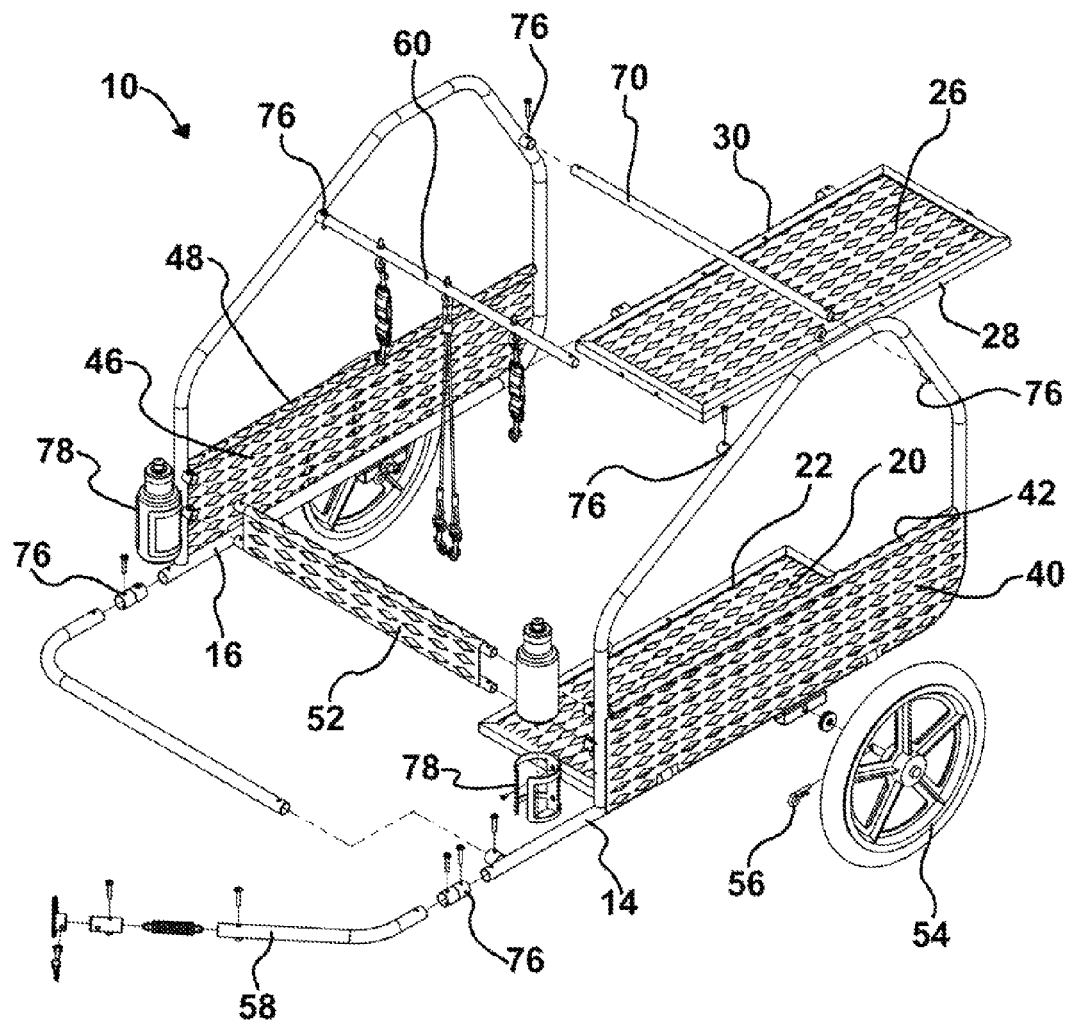
FIG. 8 is a partially-exploded, perspective view of the top, front, and right sides of a trailer according to the first embodiment configured in a riding position.
Figure 9:
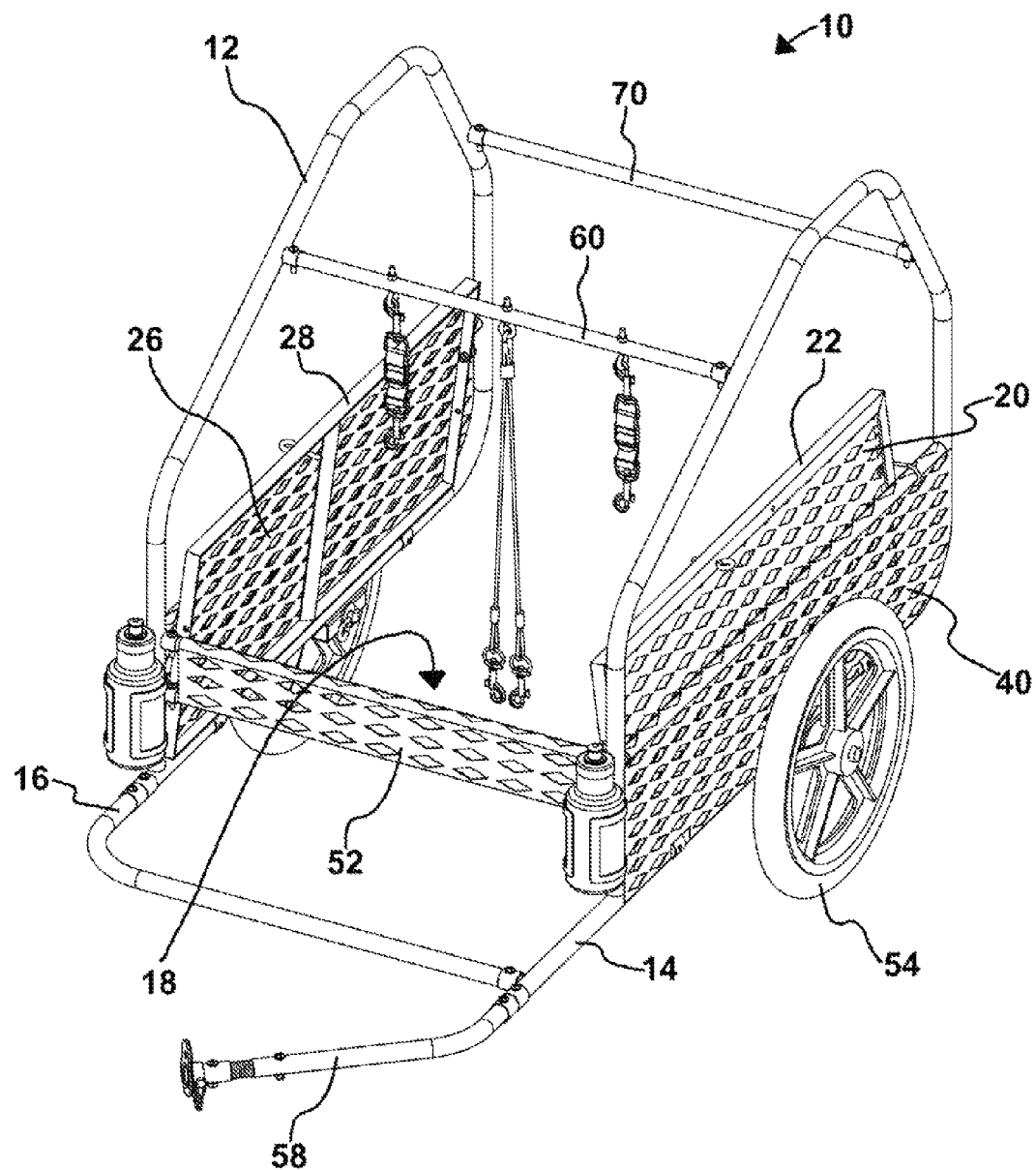
FIG. 9 is a perspective view of the top, front, and right sides of a trailer according to the first embodiment configured in a running position.

With particular attention to FIG. 8, the trailer 10 of the depicted embodiment further includes a first side bar 42 connected to the first side 14 of the frame 12. A second side bar 48 is connected to the second side 16 of the frame 12. Connected to the first side bar 42 is a first side panel 40, and connected to the second side bar 48 is a second side panel 46. The first side panel 40 and second side panel 46 provide a type of side walling for the trailer 10 and contribute to encouraging the animal or animals utilizing the trailer 10 to continue to advance forward, not to the side, while the trailer 10 is in motion. The first side panel 40 and second side panel 46 further prohibit outside animals from having ready access to the animal or animals within the trailer 10.

According to the depicted embodiment, the first side panel 40 extends perpendicularly upward from the bottom area 18 of the frame 12, and the second side panel 46 extends perpendicularly upward from the bottom area 18 of the frame 12. As such, in this embodiment, the second side panel 46 stands essentially parallel with the first side panel 40, and together they provide a wagon-like structure for the trailer 10. In other embodiments, the trailer 10 is configured so as to more resemble a tent-like structure wherein the first side panel 40 and second side panel 46 extend upwards from the bottom area 18 at an angle toward one another.

Figure 10:
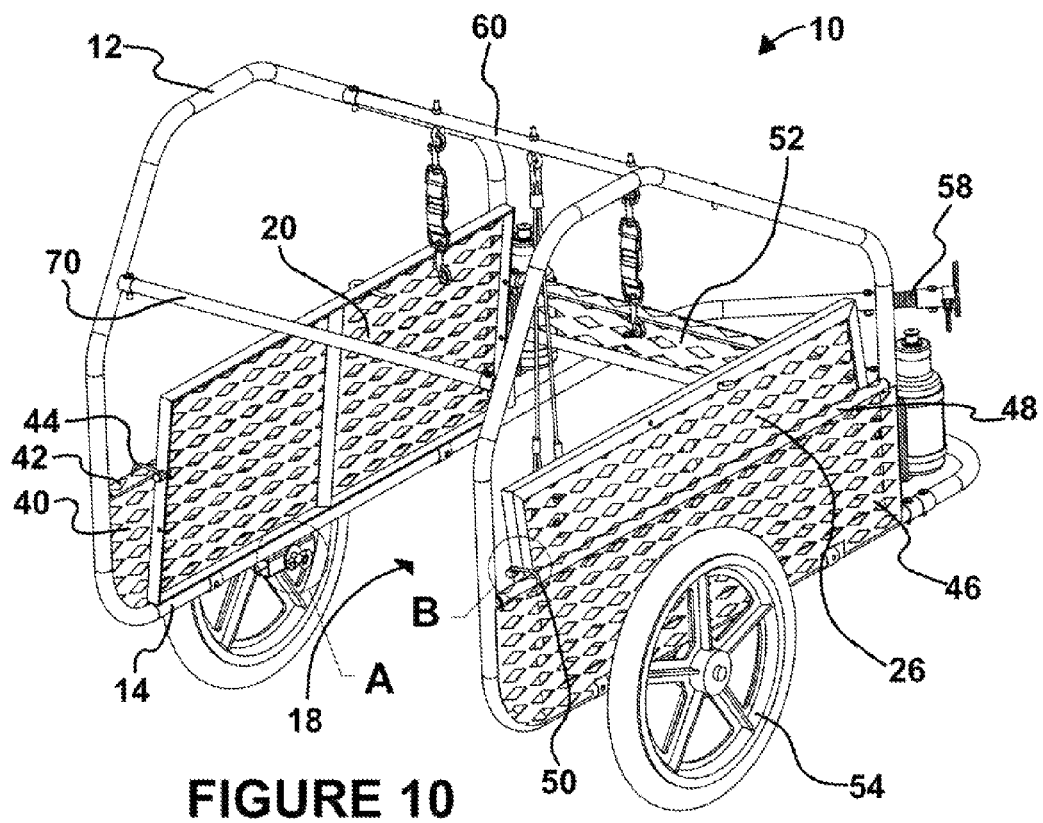
FIG. 10 is a perspective view of the top, back, and left sides of a trailer according to the first embodiment configured in a running position.
Figure 11:
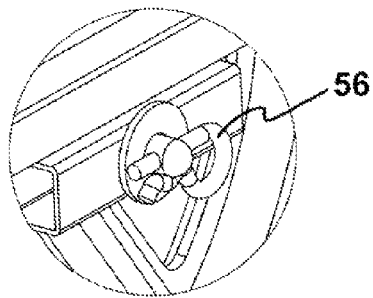
FIG. 11 is a close-up, perspective view of area A of FIG. 10.

With particular attention to FIGS. 10 and 12, according to the depicted embodiment, the first floor panel 20 further includes a first floor panel retainer 44 along its rear-most edge, and the second floor panel 26 further includes a second floor panel retainer 50 along its rear-most edge. The first floor panel retainer 44 and second floor panel retainer 50 are configured to selectively hold the first floor panel 20 and second floor panel 26, respectively, in the running position. According to the depicted embodiment, the first floor panel retainer 44 connected to the first floor panel 20 is a hook configured to be selectively secured around the second side bar 48 attached to the first side 14 of the frame 12, as shown in FIG. 10 and the close-up view of area B of that figure shown in FIG. 12. Likewise, the second floor panel retainer 50 connected to the second floor panel 26 is a hook configured to be selectively secured around the second side bar 48 attached to the second side 16 of the frame 12. As such, when the floor panels have been positioned into the running configuration, the first floor panel retainer 44 and second floor panel retainer 50 latch the floor panels in place relative to the frame 12 so as to prevent the floor panels from undesirably transitioning back into the riding position while the animals using the trailer 10 are running or walking with the trailer 10.

In some embodiments a front side panel 52 is further included and is supported by the first side 14 and second side 16 of the frame 12. Such front side panel 52 extends perpendicularly from the bottom area 18, as well as perpendicularly from the first side panel 40 and second side panel 46. As such, the first side panel 40, front side panel 52, and second side panel 46 form three walls of a open-ended box, with the first floor panel 20 and second floor panel 26 forming the bottom of the box when the first floor panel 20 and second floor panel 26 are in their riding positions.

Preferably, the upper region of the frame 12 is not necessarily covered with paneling, so as to allow the animals utilizing the trailer 10 to experience the environment in which they are moving. In other embodiments, a selectively removable and replaceable cover is included so as to provide a temporary top for the trailer 10, making it more conducive for use even in foul weather.

As shown in the figures, the trailer 10 of the depicted embodiment further includes a rear support bar 70 extending from the first side 14 and second side 16 of the frame 12, thereby providing additional structural support for the frame 12 of the trailer 10.

With particular attention to FIG. 8, in some embodiments, the trailer 10 further includes accessory receptors 78, such as water bottle receptors configured to receive bottles of water. In other embodiments, the accessory receptors 78 are configured to receive and carry a variety of pet accessories, such as toys, leashes, harnesses, baggies, medications, brushes, and food.

The trailer 10 is configured to move in conjunction with the vehicle to which the trailer 10 is connected via the attachment arm 58. According to the depicted embodiment, the trailer 10 therefore includes at least one wheel 54 connected to the frame 12 via a selectively detachable wheel securers 56, shown in FIG. 10 and in the close-up view of area A of that figure shown in FIG. 11. Preferably, one wheel 54 is attached to each of the first side 14 and second side 16 of the frame 12.

According to some embodiments of the trailer 10, the floor panel or panels define a plurality of holes. According to the depicted embodiment, the first side panel 40, second side panel 46, and front side panel 52 likewise define a plurality of holes. As such, washing of the trailer 10 can be accomplished simply by hose spraying the trailer 10.

In some embodiments, the first side 14 and second side 16 of the frame 12, as well as the leash bar 60, the rear support bar 70, the attachment arm 58, and the front side panel 52 are connected via detachable frame connectors 76 configured to allow for easy disassembly of the constructed trailer 10 into a minimal number of parts that can then be easily transported in the trunk of an automobile, for example. In other of such embodiments, each of the floor panels is likewise connected to the frame 12 via detachable frame connectors 76, thereby breaking the floor panels easily detachable.

Notably, according to the preferred embodiment, the position of the first floor panel 20 is not dependent upon the position of the second floor panel 26. Therefore both the first floor panel 20 and second floor panel 26 can be selectively positioned in the riding position such that both the first floor panel 20 and second floor panel 26 are configured to carry and transport a first and second animal as the trailer 10 moves; or the first floor panel 20 and second floor panel 26 can be selectively positioned in their running positions such that both the first floor panel 20 and second floor panel 26 are configured to exercise a first and second animal as trailer 10 moves; or the first floor panel 20 can be positioned in its riding position while the second floor panel 26 is positioned in its running position such that a first animal can ride in the trailer 10 while a second animal is exercised; or, finally, the first floor panel 20 can be positioned in its running position while the second floor panel 26 is positioned in its riding position, such that a first animal is exercised while a second animal rides in the trailer 10.

The exemplary embodiments shown in the figures and described above illustrate, but do not limit, the invention. It should be understood that there is no intention to limit the invention to the specific form disclosed; rather, the invention is to cover all modifications, alternative constructions, and equivalents falling within the spirit and scope of the invention as defined in the claims. For example, while the exemplary embodiments contemplate use of the trailer 10 with dogs, the trailer 10 is not limited to use with dogs. Further, while the figures depict a rectangular trailer 10, in other embodiments, the trailer 10 is differently shaped. Still further, while the figures depict the floor panels being secured in only an essentially-flat riding position or an essentially-vertical running position, the floor panels may be secured at other positions relative to the frame 12 and bottom area 18. Hence, the foregoing description should not be construed to limit the scope of the invention, which is defined in the following claims. Further, it will be apparent that various changes may be made without departing from the spirit and scope of the invention, as defined by the following claims.

What is claimed is:

1. A trailer for attachment to a vehicle, said trailer comprising: a frame having a first side, a second side, and defining a bottom area bordered by said first side and said second side; an attachment arm connected to said frame, said attachment arm being configured to connect said trailer to said vehicle; a floor panel having and a floor panel outer edge, said floor panel being supported by said frame at said floor panel outer edge, said floor panel being configured to selectively pivot about said floor panel outer edge between a riding position, in which said floor panel and said bottom area define a first pivot angle, said floor panel being configured to support an animal when said floor panel is positioned in said riding position; a running position, in which said floor panel and said bottom area define a second pivot angle, said second pivot angle being greater than said first pivot angle; a leash attachment point supported by said frame, said leash attachment point configured to support a leash, said leash being configured to detachably tether said animal to said trailer; whereby, when said floor panel is positioned in said riding position, said trailer is configured to carry and transport said animal as said vehicle moves; and whereby, when said floor panel is positioned in said running position, said trailer is configured to exercise said animal such that said animal is free to move under its own power in connection with said vehicle as said vehicle moves.

2. The trailer of claim 1, further comprising: a first side panel supported by said first side of said frame, said first side panel extending perpendicularly from said bottom area of said frame; and a second side panel supported by said second side of said frame, said second side panel extending perpendicularly from said bottom area of said frame.

3. The trailer of claim 2, further comprising a front side panel supported by said first side and said second side of said frame, said front side panel extending perpendicularly from said bottom area of said frame.

4. The trailer of claim 2, further comprising a floor panel retainer configured to selectively hold said floor panel in said running position.

5. The trailer of claim 1, further comprising a detachable leash bar extending between said first side and said second side, said leash attachment point being located along said leash bar.

6. The trailer of claim 5, further comprising a flooring supporter connected to said leash bar, said flooring supporter being configured to selectively support said floor panel in said riding position.

7. The trailer of claim 1, wherein said first pivot angle is essentially 0 degrees.

8. The trailer of claim 1, wherein said second pivot angle is essentially 90 degrees.

9. A trailer for attachment to a vehicle, said trailer comprising: a frame having a first side, a second side, and defining a bottom area bordered by said first side and said second side; an attachment arm connected to said frame, said attachment arm being configured to connect said trailer to said vehicle; a first floor panel supportable by said frame, said first floor panel being configured to selectively transition between a first riding position, in which said first floor panel is supported by said frame and at least partially spans said bottom area of said frame to occupy a first maximum floor area; said first floor panel being configured to support a first animal when said first floor panel is positioned in said first riding position; and a first running position, in which said first floor panel is at least partially removed from said bottom area of said frame to occupy a first minimal floor area; a second floor panel supportable by said frame, said second floor panel being configured to selectively transition between a second riding position, in which said second floor panel is supported by said frame and at least partially spans said bottom area of said frame to occupy a second maximum floor area; said second floor panel being configured to support a second animal when said second floor panel is positioned in said second riding position; and a second running position, in which said second floor panel is at least partially removed from said bottom area of said frame to occupy a second minimal floor area; a first leash attachment point supported by said frame and configured to support a first leash, said first leash being configured to detachably tether said first animal to said trailer; a second leash attachment point supported by said frame and configured to support a second leash, said second leash being configured to detachably tether said second animal to said trailer; whereby, when said first floor panel is positioned in said first riding position, said trailer is configured to carry and transport said first animal as said vehicle moves; whereby, when said first floor panel is positioned in said first running position, said trailer is configured to exercise said first animal such that said first animal is free to move under its own power in connection with said vehicle as said vehicle moves; whereby, when said second floor panel is positioned in said second riding position, said trailer is configured to carry and transport said second animal as said vehicle moves; whereby, when said second floor panel is positioned in said second running position, said trailer is configured to exercise said second animal such that said second animal is free to move under its own power in connection with said vehicle as said vehicle moves; whereby, when said first floor panel is positioned in said first riding position and said second floor panel is positioned in said second riding position, said trailer is configured to carry and transport both said first animal and said second animal as said vehicle moves; whereby, when said first floor panel is positioned in said first riding position and said second floor panel is positioned in said second running position, said trailer is configured to carry and transport said first animal and to exercise said second animal as said vehicle moves; whereby, when said first floor panel is positioned in said first running position and said second floor panel is positioned in said second riding position, said trailer is configured to exercise said first animal and to carry and transport said second animal as said vehicle moves; and whereby, when said first floor panel is positioned in said first running position and said second floor panel is positioned in said second running position, said trailer is configured to exercise both said first animal and said second animal as said vehicle moves.

10. The trailer of claim 9, further comprising: a first side panel supported by said first side of said frame, said first side panel extending perpendicularly from said bottom area of said frame; and a second side panel supported by said second side of said frame, said second side panel extending perpendicularly from said bottom area of said frame.

11. A trailer for attachment to a vehicle, said trailer comprising:
  a frame having a first side, a second side, and defining a bottom area bordered by said first side and said second side;
  an attachment arm connected to said frame, said attachment arm being configured to connect said trailer to said vehicle;
  a floor panel supportable by said frame, said floor panel being configured to selectively transition between a riding position, in which said floor panel is supported by said frame and at least partially spans said bottom area of said frame to occupy a maximum floor area;
  said floor panel being configured to support an animal when said floor panel is positioned in said riding position; and a running position, in which said floor panel is at least partially removed from said bottom area of said frame to occupy a minimal floor area;

a leash attachment point supported by said frame, said leash attachment point configured to support a leash, said leash being configured to detachably tether said animal to said trailer;

a first side panel supported by said first side of said frame, said first side panel extending perpendicularly from said bottom area of said frame;

a second side panel supported by said second side of said frame, said second side panel extending perpendicularly from said bottom area of said frame;

a floor panel retainer configured to selectively hold said floor panel in said running position; whereby, when said floor panel is positioned in said riding position, with said trailer is configured to carry and transport said animal as said vehicle moves; and whereby, when said floor panel is positioned in said running position, said trailer is configured to exercise said animal such that said animal is free to move under its own power in connection with said vehicle as said vehicle moves.

12. The trailer of claim 11, wherein said floor panel retainer comprises a hook configured to selectively connect said floor panel to said first side panel.

13. A trailer for attachment to a vehicle, said trailer comprising:

a frame having a first side, a second side, and defining a bottom area bordered by said first side and said second side;

an attachment arm connected to said frame, said attachment arm being configured to connect said trailer to said vehicle;

a floor panel supportable by said frame, said floor panel being configured to selectively transition between a riding position, in which said floor panel is supported by said frame and at least partially spans said bottom area of said frame to occupy a maximum floor area;

said floor panel being configured to support an animal when said floor panel is positioned in said riding position; and a running position, in which said floor panel is at least partially removed from said bottom area of said frame to occupy a minimal floor area;

a leash attachment point supported by said frame, said leash attachment point configured to support a leash, said leash being configured to detachably tether said animal to said trailer;

whereby, when said floor panel is positioned in said riding position, said trailer is configured to carry and transport said animal as said vehicle moves; and whereby, when said floor panel is positioned in said running position, said trailer is configured to exercise said animal such that said animal is free to move under its own power in connection with said vehicle as said vehicle moves;

a detachable leash bar extending between said first side and said second side, said leash attachment point being located along said leash bar.

14. The trailer of claim 13, further comprising a flooring supporter connected to said leash bar, said flooring supporter being configured to selectively support said floor panel in said riding position.

* * * * *